(12) United States Patent
Nakahara et al.

(10) Patent No.: US 12,044,148 B2
(45) Date of Patent: Jul. 23, 2024

(54) NOZZLE COMPONENT, VARIABLE NOZZLE MECHANISM OF VARIABLE GEOMETRY TURBOCHARGER, VARIABLE GEOMETRY TURBOCHARGER, AND METHOD OF PRODUCING NOZZLE COMPONENT

(71) Applicant: MITSUBISHI HEAVY INDUSTRIES ENGINE & TURBOCHARGER, LTD., Sagamihara (JP)

(72) Inventors: Yuya Nakahara, Tokyo (JP); Yosuke Danmoto, Sagamihara (JP); Yoji Akiyama, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/020,561

(22) PCT Filed: Dec. 28, 2020

(86) PCT No.: PCT/JP2020/049181
§ 371 (c)(1),
(2) Date: Feb. 9, 2023

(87) PCT Pub. No.: WO2022/144995
PCT Pub. Date: Jul. 7, 2022

(65) Prior Publication Data
US 2023/0313696 A1    Oct. 5, 2023

(51) Int. Cl.
*F01D 9/04* (2006.01)
*F01D 17/16* (2006.01)
*F01D 25/00* (2006.01)

(52) U.S. Cl.
CPC .......... *F01D 9/045* (2013.01); *F01D 17/165* (2013.01); *F01D 25/005* (2013.01);
(Continued)

(58) Field of Classification Search
CPC ........ F01D 17/165; F01D 25/005; F01D 5/28; F01D 9/045; F02B 37/24; F02C 6/12;
(Continued)

(56) References Cited

U.S. PATENT DOCUMENTS 11,414,728 B2 * 8/2022 Wang ........................ C22F 1/10
2004/0050463 A1    3/2004 Jung et al.
(Continued)

FOREIGN PATENT DOCUMENTS

EP    3 045 677 A1    7/2016
JP    2004-520491 A    7/2004
(Continued)

OTHER PUBLICATIONS

International Preliminary Report on Patentability and Written Opinion of the International Searching Authority for International Application No. PCT/JP2020/049181, dated Jul. 13, 2023, with an English translation.
(Continued)

*Primary Examiner* — Jesse S Bogue
(74) *Attorney, Agent, or Firm* — Birch, Stewart, Kolasch & Birch, LLP

(57) ABSTRACT

A nozzle component according to at least one embodiment of the present disclosure is a nozzle component included in a variable nozzle mechanism of a variable geometry turbocharger. The nozzle component is composed of an iron-based alloy and satisfying the following relational expression: $6.6 \times A + B \geq 8.0$, where A is a total value (mass %) of carbon content and nitrogen content, and B is a total value (mass %) of 0.5 times tungsten content and molybdenum content. The total value B is 1.5 mass % or more.

10 Claims, 6 Drawing Sheets

(52) U.S. Cl.
CPC .... *F05D 2220/40* (2013.01); *F05D 2240/128* (2013.01); *F05D 2300/171* (2013.01)

(58) Field of Classification Search
CPC ........... F05D 2220/40; F05D 2240/128; F05D 2300/171; Y02T 10/12
See application file for complete search history.

(56) References Cited

U.S. PATENT DOCUMENTS

| | | | |
|---|---|---|---|
| 2005/0006006 A1* | 1/2005 | Schall | C22C 38/22 |
| | | | 148/225 |
| 2008/0112815 A1 | 5/2008 | Ruch et al. | |
| 2010/0202874 A1 | 8/2010 | Hayashi et al. | |
| 2014/0356218 A1* | 12/2014 | Berglund | C22C 38/24 |
| | | | 419/48 |
| 2016/0160700 A1 | 6/2016 | Takahashi | |
| 2020/0116033 A1* | 4/2020 | Srinivasan | F01D 5/288 |

FOREIGN PATENT DOCUMENTS

| | | |
|---|---|---|
| JP | 2005-539138 A | 12/2005 |
| JP | 2008-525630 A | 7/2008 |
| JP | 4875602 B2 | 2/2012 |
| JP | 2012-52520 A | 3/2012 |
| JP | 2014-530294 A | 11/2014 |
| JP | 2015-10512 A | 1/2015 |
| JP | 5658804 B1 | 1/2015 |
| JP | 2017-179561 A | 10/2017 |
| JP | 6684629 B2 | 4/2020 |

OTHER PUBLICATIONS

International Search Report and Written Opinion of the International Searching Authority for International Application No. PCT/JP2020/049181, dated March 2; 2021.

* cited by examiner

FIG. 5

| Specimen (All Fe-based) | A (wt%) | B (wt%) | Specific wear amount (with wear of No. 4-3 being 1) | C (wt%) | N (wt%) | Mo (wt%) | W (wt%) | Cr (wt%) | Ni (wt%) | Cu (wt%) | Mating material | Load (N) | Rotation speed (rpm) | Test temperature (°C) |
|---|---|---|---|---|---|---|---|---|---|---|---|---|---|---|
| No. 1-1 | 1.6 | 3.9 | 2 | 1.2 | 0.4 | 2.5 | 2.8 | 24 | 14 | 2.3 | Fe alloy X | 264 | 4.1 | 780 |
| No. 1-2 | 0.5 | 3.25 | 179.5 | 0.5 | 0 | 2 | 2.5 | 24 | 18 | 2 | ← | ← | ← | ← |
| No. 1-3 | 2.4 | 0.5 | 12.3 | 2.4 | 0 | 0.5 | 0 | 22 | 14 | – | ← | ← | ← | ← |
| No. 1-4 | 0.04 | 0 | 2315.6 | 0.04 | 0 | 0 | 0 | 25 | 20 | – | ← | ← | ← | ← |
| No. 1-5 | 2.3 | 2 | 12.2 | 2.3 | 0 | 2 | 0 | 32 | – | – | ← | ← | ← | ← |
| No. 1-6 | 1.4 | 5.3 | 1.8 | 1.4 | 0 | 4.5 | 1.6 | 21 | 9 | – | ← | ← | ← | ← |
| No. 1-7 | 0.5 | 4.1 | 20.6 | 0.3 | 0.2 | 2.7 | 2.8 | 26 | 22 | 1.5 | ← | ← | ← | ← |
| No. 1-8 | 0.9 | 4.1 | 10.8 | 0.7 | 0.2 | 2.3 | 3.6 | 24 | 14 | – | ← | ← | ← | ← |
| No. 1-9 | 0.6 | 1.4 | 172.5 | 0.6 | 0 | 0 | 2.8 | 24 | 14 | 1.5 | ← | ← | ← | ← |
| No. 2-1 | 1.3 | 3.9 | 4 | 0.9 | 0.4 | 2.5 | 2.8 | 24 | 14 | 2.3 | Fe alloy Y | 88 | 27.3 | 850 |
| No. 2-2 | 0.3 | 4.25 | 45.9 | 0.1 | 0.2 | 3 | 2.5 | 21 | 20 | – | ← | ← | ← | ← |
| No. 3-1 | 0.88 | 4.1 | 2.5 | 0.7 | 0.18 | 2.3 | 3.6 | 24 | 14 | 1.5 | Ni alloy X | 264 | 4.1 | 780 |
| No. 3-2 | 0.5 | 4.1 | 10.8 | 0.3 | 0.2 | 2.7 | 2.8 | 26 | 22 | 1.5 | ← | ← | ← | ← |
| No. 3-3 | 1.3 | 3.9 | 2.1 | 0.9 | 0.4 | 2.5 | 2.8 | 24 | 14 | 2.3 | ← | ← | ← | ← |
| No. 3-4 | 0.6 | 1.4 | 150.8 | 0.6 | 0 | 0 | 2.8 | 24 | 14 | – | ← | ← | ← | ← |
| No. 3-5 | 0.5 | 3.25 | 76.5 | 0.5 | 0 | 2 | 2.5 | 24 | 18 | 2 | ← | ← | ← | ← |
| No. 4-1 | 0.7 | 1.5 | 16.9 | 0.5 | 0.2 | 0 | 3 | 25 | 20 | – | Ni alloy Y | 88 | 27.3 | 880 |
| No. 4-2 | 0.8 | 1.5 | 17.6 | 0.6 | 0.2 | 0 | 3 | 25 | 20 | – | ← | ← | ← | ← |
| No. 4-3 | 1.1 | 4 | 1 | 0.9 | 0.2 | 2.5 | 3 | 25 | 20 | – | ← | ← | ← | ← |
| No. 4-4 | 0.8 | 3.9 | 2.5 | 0.6 | 0.2 | 2.5 | 2.8 | 24 | 18 | 2.3 | ← | ← | ← | ← |
| No. 4-5 | 1.1 | 1.8 | 3 | 0.9 | 0.2 | 0.4 | 2.8 | 24 | 18 | 2.3 | ← | ← | ← | ← |

NOZZLE COMPONENT, VARIABLE NOZZLE MECHANISM OF VARIABLE GEOMETRY TURBOCHARGER, VARIABLE GEOMETRY TURBOCHARGER, AND METHOD OF PRODUCING NOZZLE COMPONENT

TECHNICAL FIELD

The present disclosure relates to a nozzle component, a variable nozzle mechanism of a variable geometry turbocharger, a variable geometry turbocharger, and a method of producing a nozzle component.

BACKGROUND

In an internal combustion engine equipped with a turbocharger, a variable displacement exhaust turbocharger, which can vary the flow passage area for exhaust gas supplied from a spiral scroll passage to a turbine according to the operating conditions of the engine, has been widely used in recent years in order to match the exhaust gas flow rate from the engine with the gas flow rate that is the optimum operating condition for the turbocharger.

The variable displacement exhaust turbocharger is provided with a variable nozzle mechanism to transmit a driving force from an actuator to a nozzle vane via a linkage part to change the blade angle of the nozzle vane.

In such a variable nozzle mechanism, the drive member that drives the nozzle vane has a sliding portion, which causes problems such as wear of the sliding portion.

For example, in a variable nozzle mechanism described in Patent Document 1, the wear is suppressed by modifying the shape of components that come into contact with each other (see Patent Document 1).

CITATION LIST

Patent Literature

Patent Document 1: JP4875602B

SUMMARY

Problems to be Solved

For example, there is a need not only to modify the shape of the variable nozzle mechanism as described in Patent Document 1, but also to improve the wear resistance of the material of the variable nozzle mechanism itself in high-temperature environments.

In view of the above, an object of at least one embodiment of the present disclosure is to improve the wear resistance of a nozzle component included in a variable nozzle mechanism of a variable geometry turbocharger in high-temperature environments.

Solution to the Problems (1) A nozzle component according to at least one embodiment of the present disclosure is a nozzle component included in a variable nozzle mechanism of a variable geometry turbocharger. The nozzle component is composed of an iron-based alloy and satisfies the following relational expression:

$$6.6 \times A + B \geq 8.0,$$

where A is a total value (mass %) of carbon content and nitrogen content, and B is a total value (mass %) of 0.5 times tungsten content and molybdenum content, and the total value B is 1.5 mass % or more.

(2) A variable nozzle mechanism of a variable geometry turbocharger according to at least one embodiment of the present disclosure is provided with: a first component; and a second component capable of sliding against the first component. The first component is the nozzle component having the above configuration (1).

(3) A variable geometry turbocharger according to at least one embodiment of the present disclosure is provided with the variable nozzle mechanism having the above configuration (2).

(4) A nozzle component producing method according to at least one embodiment of the present disclosure is a method of producing a nozzle component included in a variable nozzle mechanism of a variable geometry turbocharger and includes a step of forming the nozzle component having the above configuration (1) by casting or machining a plate material.

Advantageous Effects

According to at least one embodiment of the present disclosure, it is possible to improve the wear resistance of a nozzle component included in a variable nozzle mechanism of a variable geometry turbocharger in high-temperature environments.

BRIEF DESCRIPTION OF DRAWINGS

FIG. 5 is a table showing results of wear resistance test of iron-based alloy in high-temperature environments.

DETAILED DESCRIPTION

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Overall Configuration of Variable Geometry Turbocharger)

Figure 1:
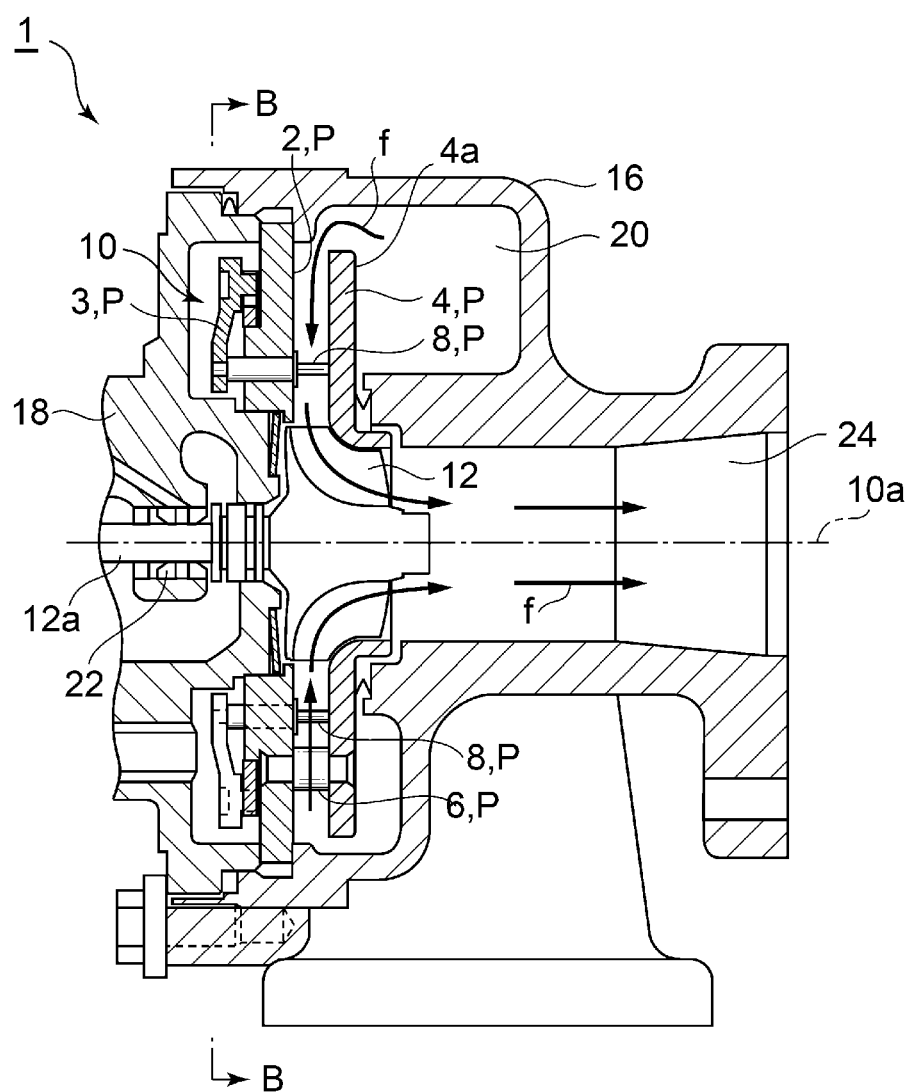
FIG. 1 is a cross-sectional view of a variable geometry turbocharger according to an embodiment.
Figure 2:
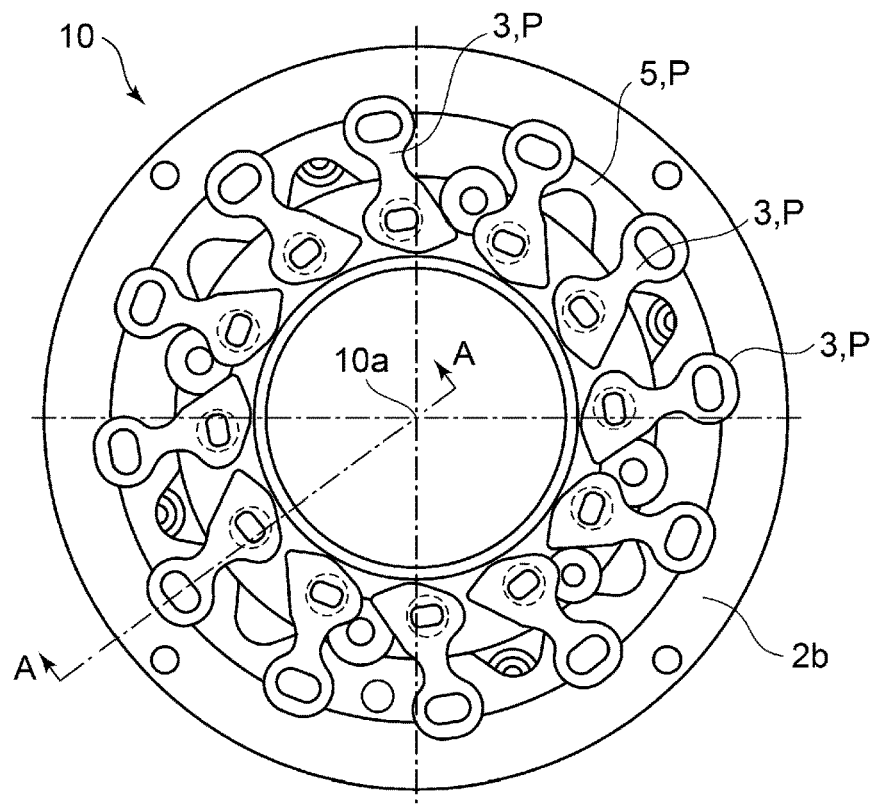
FIG. 2 is a cross-sectional view taken along line B-B in FIG. 1.
Figure 3:
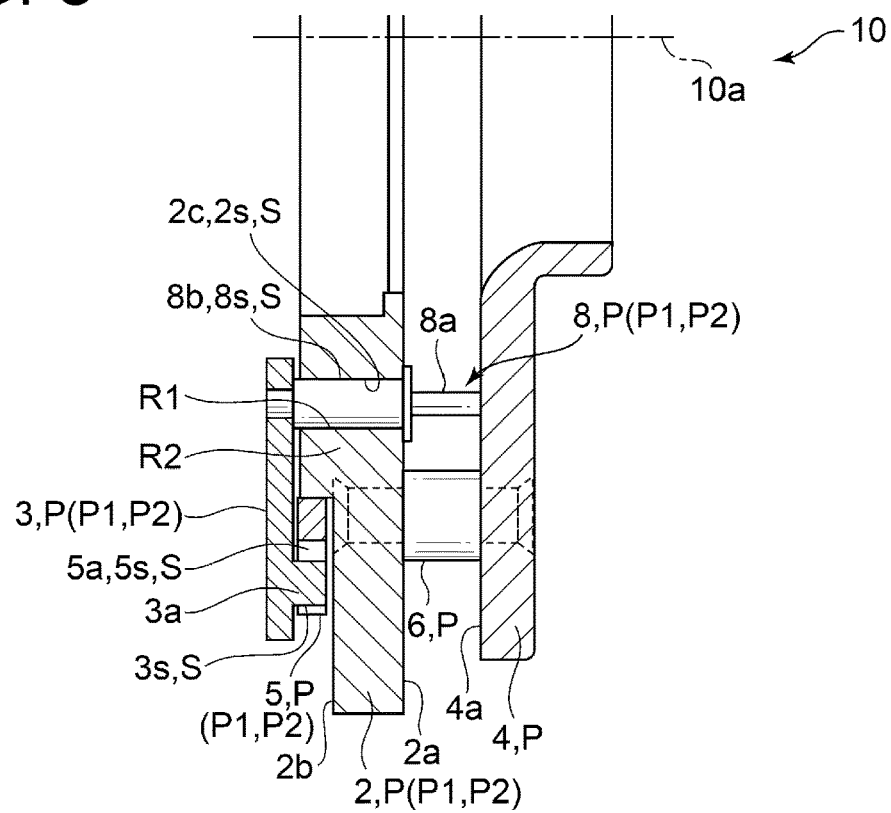
FIG. 3 is a cross-sectional view taken along line A-A in FIG. 2.

FIG. 1 is a cross-sectional view of a variable geometry turbocharger according to an embodiment. FIG. 2 is a cross-sectional view taken along line B-B in FIG. 1. FIG. 3 is a cross-sectional view taken along line A-A in FIG. 2. First, with reference to FIGS. 1 to 3, a basic configuration of a variable nozzle mechanism 10 of a variable geometry turbocharger 1 according to an embodiment will be described.

As shown in FIG. 1, in a variable geometry turbocharger 1 according to an embodiment, a turbine housing 16 for accommodating a turbine rotor 12 and a bearing housing 18 for accommodating a bearing 22 which rotatably supports a rotational shaft 12a of the turbine rotor 12 are fastened with, for example, bolts. Further, although not depicted, on the opposite side of the bearing housing 18 from the turbine housing 16, a compressor housing for accommodating a compressor rotor coupled to the rotational shaft 12a is connected to the bearing housing 18.

On the outer peripheral side of the turbine housing 16, a scroll-shaped exhaust gas passage 20 is formed, which communicates with an exhaust manifold (not shown) and through which exhaust gas discharged from an engine flows. A variable nozzle mechanism 10 for controlling the flow of exhaust gas acting on the turbine rotor 12 is disposed between the scroll-shaped exhaust gas passage 20 and the turbine rotor 12.

(Variable Nozzle Mechanism 10)

As shown in FIG. 1, the variable nozzle mechanism 10 according to an embodiment is interposed between the turbine housing 16 and the bearing housing 18 and fixed to the bearing housing 18 by fastening a nozzle mount 2 to the bearing housing 18 with bolts or the like. As shown in FIG. 3, the variable nozzle mechanism 10 has a nozzle support 6, which is a columnar member, connected at one end to one surface 2a of the nozzle mount 2. The other end of the nozzle support 6 is connected to one surface 4a of a nozzle plate 4. In plan view, multiple nozzle supports 6 are connected circumferentially between one surface 2a of the nozzle mount 2 and one surface 4a of the nozzle plate 4. Thereby, the nozzle plate 4 is supported apart from one surface 2a of the nozzle mount 2.

As shown in FIGS. 2 and 3, on the other surface 2b of the nozzle mount 2, a disk-shaped drive ring 5 is rotatably disposed. Further, a plurality of lever plates 3 are connected at one end to the drive ring 5. Specifically, the outer peripheral edge of the drive ring 5 has a plurality of groove portions 5a along the circumferential direction, and connecting shaft portions 3a provided at one end of the lever plates 3 are engaged into the groove portions 5a. Each connecting shaft portion 3a may be a projection portion protruding toward the nozzle mount 2 at one end of the lever plate 3, or may be a shaft member attached to one end of the lever plate 3.

Each lever plate 3 is connected at the other end to a nozzle vane member 8. Specifically, the nozzle vane member 8 has a nozzle vane (blade portion) 8a for controlling the flow of exhaust gas, and a nozzle shaft 8b integrally formed with the nozzle vane 8a. That is, in the nozzle vane member 8, the nozzle vane 8a is formed at one end of the nozzle shaft 8b. The other end of the nozzle shaft 8b is connected to the other end of the lever plate 3.

The nozzle shaft 8b of the nozzle vane member 8 is rotatably inserted through a through hole 2c of the nozzle mount 2.

The same number of lever plates 3 as the nozzle vane members 8 are arranged along the circumferential direction of the drive ring 5.

In the following description, the above-described components constituting the variable nozzle mechanism 10 are each also referred to as a nozzle component P.

In the variable nozzle mechanism 10 according to the embodiment thus configured, as the drive ring 5 rotates about the central axis 10a of the variable nozzle mechanism 10, each lever plate 3 rotates to change the blade angle of the nozzle vane 8a.

When the drive ring 5 rotates about the central axis 10a of the variable nozzle mechanism 10, relative sliding occurs, for example, between the outer peripheral surface 8s of the nozzle shaft 8b and the inner peripheral surface 2s of the through hole 2c of the nozzle mount 2, and relative sliding occurs, for example, between the outer peripheral surface 3s of the connecting shaft portion 3a at one end of the lever plate 3 and the inner peripheral surface 5s of the groove portion 5a of the drive ring 5.

In the variable geometry turbocharger 1 including the variable nozzle mechanism 10 according to the embodiment thus configured, exhaust gas having flowed through the scroll-shaped exhaust gas passage 20 flows into a space between the nozzle mount 2 and the nozzle plate 4 as indicated by the arrow f in FIG. 1, where the nozzle vanes 8a control the flow direction of the gas so as to flow into a central portion of the turbine housing 16. Then, after acting on the turbine rotor 12, the exhaust gas is discharged to the outside through an exhaust outlet 24.

As described above, a variable nozzle mechanism, such as the variable nozzle mechanism 10 according to an embodiment, has wear and other problems due to parts that slide during operation of a variable geometry turbocharger. In addition, since iron-based alloy is generally less expensive than heat-resistant nickel-based alloy, it is desirable to use more iron-based alloy than heat-resistant nickel-based alloy in the variable nozzle mechanism from the viewpoint of reducing the manufacturing cost. However, when using a variable geometry turbocharger in a gasoline engine, where the temperature of exhaust gas tends to be higher than in a diesel engine, heat-resistant nickel-based alloy, which is more expensive than iron-based alloy, often has to be used from the viewpoint of wear resistance and sticking prevention in high-temperature environments. However, it is desirable to construct nozzle components with iron-based alloy, which is a relatively inexpensive material.

For example, in order to increase the hardness and improve the wear resistance of iron-based alloy, carbon and nitrogen could be added. However, although carbon and nitrogen increase the hardness of a material, they are light elements and therefore relatively easy to diffuse in high-temperature environments, such as 700° C. or higher, to which nozzle components included in a variable nozzle mechanism of a variable geometry turbocharger would be exposed. Therefore, addition of carbon or nitrogen to iron-based alloy may not lead to the desired increase in hardness. Further, the added carbon and nitrogen may bond with other elements in the iron-based alloy, making the alloy too hard and brittle. It is thus desirable to improve the wear resistance of iron-based alloy in high-temperature environments without relying on carbon and nitrogen.

Then, in addition to carbon and nitrogen, molybdenum and tungsten are added to iron-based alloy to improve the wear resistance of the iron-based alloy in high-temperature environments. Molybdenum and tungsten are stable and do not bond with other elements in the iron-based alloy as easily as carbon and nitrogen, and are less likely to diffuse than carbon and nitrogen even in high-temperature conditions.

As a result of inventors' diligent study, it was found that, in the case where a nozzle component P of the variable nozzle mechanism 10 according to an embodiment is composed of an iron-based alloy, the wear resistance of the nozzle component P in high-temperature environments can be improved by adopting the composition satisfying the following conditions.

Specifically, it was found that an iron-based alloy excellent in wear resistance in high-temperature environments can be obtained when the alloy satisfies the following relational expression (1) and the total value B is 1.5 mass % or more:

$$6.6 \times A + B \geq 8.0 \tag{1},$$

where A is a total value (mass %) of carbon content and nitrogen content, and B is a total value (mass %) of 0.5 times tungsten content and molybdenum content.

Thus, when the nozzle component P is composed of such an iron-based alloy, it is possible to improve the wear resistance in high-temperature environments.

Figure 4A:
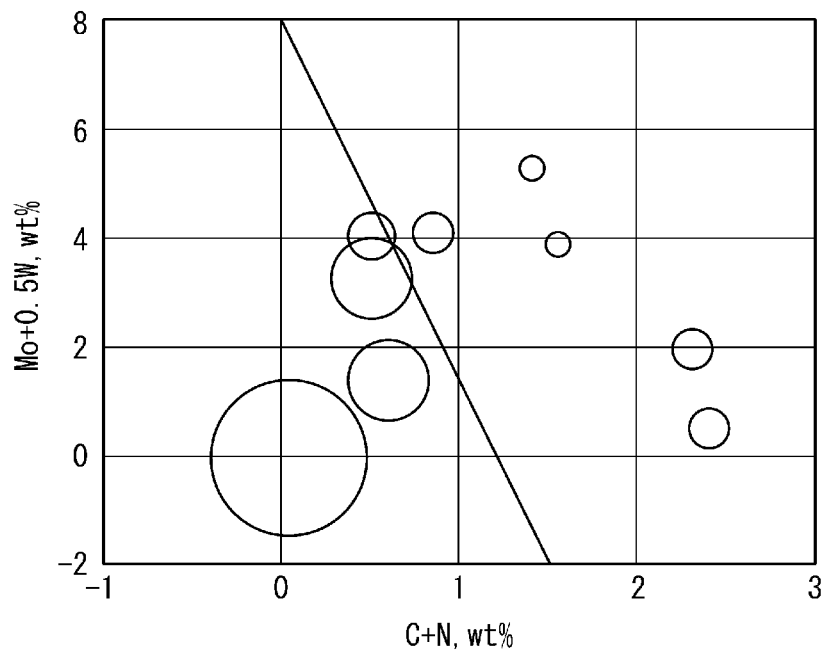
FIG. 4A is a graph showing results of wear resistance test of iron-based alloy in high-temperature environments.
Figure 4B:
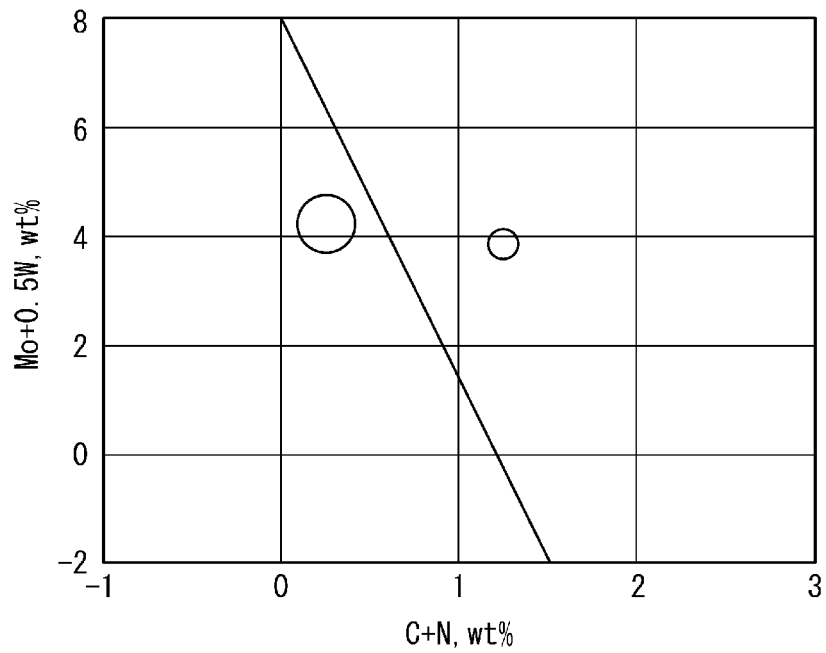
FIG. 4B is a graph showing results of wear resistance test of iron-based alloy in high-temperature environments.
Figure 4C:
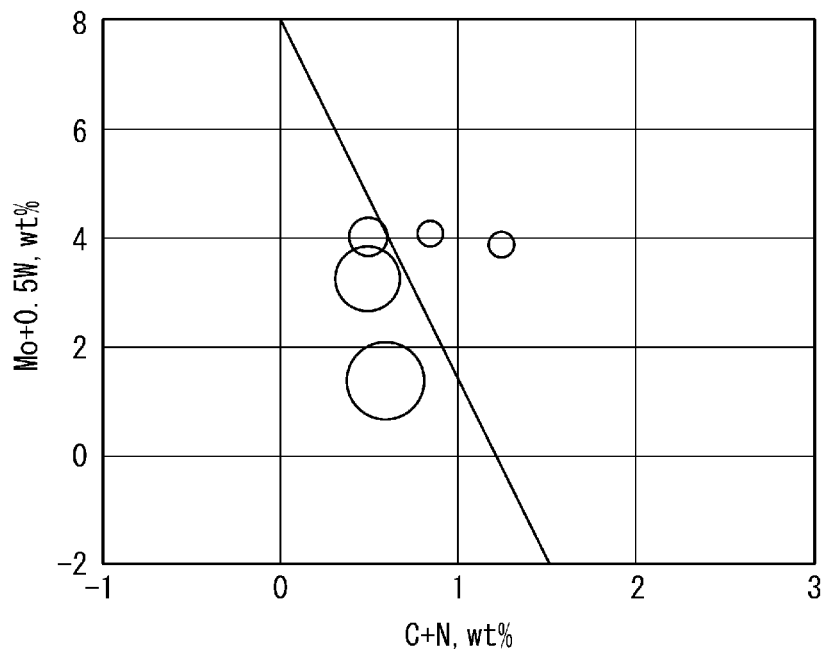
FIG. 4C is a graph showing results of wear resistance test of iron-based alloy in high-temperature environments.
Figure 4D:
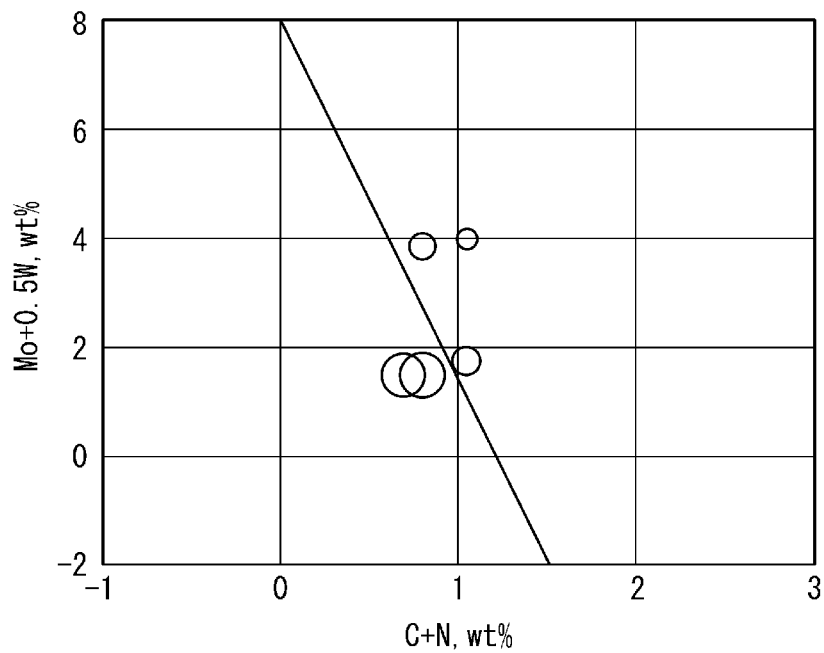
FIG. 4D is a graph showing results of wear resistance test of iron-based alloy in high-temperature environments.

FIGS. 4A to 4D are each a graph showing results of wear resistance test of iron-based alloy in high-temperature environments. FIG. 5 is a table showing results of wear resistance test of iron-based alloy in high-temperature environments. FIG. 4A shows results of Specimens Nos. 1-1 to 1-9 in FIG. 5. FIG. 4B shows results of Specimens Nos. 2-1 and 2-2 in FIG. 5. FIG. 4C shows results of Specimens Nos. 3-1 to 3-5 in FIG. 5. FIG. 4D shows results of Specimens Nos. 4-1 to 4-5 in FIG. 5.

In the test results shown in FIG. 5, the specific wear amount is a relative value assuming that the wear amount in Specimen No. 4-3 is 1.

FIGS. 4A to 4D show circular plots of the specific wear amount of the test results shown in FIG. 5. The area of the plot is proportional to the square root of the specific wear amount.

The graph line L in FIGS. 4A to 4D is the graph line when the inequality sign in the relational expression represented by the expression (1) is replaced by the equality sign. In FIGS. 4A to 4D, the graph line and the region to the right of the graph line satisfy the relational expression (1).

The wear resistance test, the test results of which are shown in FIG. 5, was conducted with the ring-on-disk method. One of the material combination shown in FIG. 5 was a ring-type specimen and the other was a disk-type specimen. With the disk-type specimen in contact with the ring-type specimen, the ring-type specimen was heated until the temperature near its contact surface reached the test temperature, and then the ring-type specimen was pressed against the disk-type specimen at the test load and rotated in one direction at the test rotation speed.

The test conditions for each specimen are as follows.

Regarding Specimens nos. 1-1 to 1-9, the mating material was an iron-based alloy (referred to as iron-based alloy X), the test load was 264 (N), the rotation speed was 4.1 (rpm), and the test temperature was 780 (° C.).

Regarding Specimens nos. 2-1 and 2-2, the mating material was an iron-based alloy with a composition different from iron-based alloy X (referred to as iron-based alloy Y), the test load was 88 (N), the rotation speed was 27.3 (rpm), and the test temperature was 850 (° C.).

Regarding Specimens nos. 3-1 to 3-5, the mating material was a nickel-based alloy (referred to as nickel-based alloy X), the test load was 264 (N), the rotation speed was 4.1 (rpm), and the test temperature was 780 (° C.).

Regarding Specimens nos. 4-1 to 4-5, the mating material was a nickel-based alloy with a composition different from nickel-based alloy X (referred to as nickel-based alloy Y), the test load was 88 (N), the rotation speed was 27.3 (rpm), and the test temperature was 850 (° C.).

Since the wear amount (specific wear amount) of each specimen varies depending on differences in test conditions, such as differences in mating material, FIGS. 4A to 4D show the test results shown in FIG. 5 separately for each test condition.

As can be seen from FIGS. 4A to 4D, the specimens that do not satisfy the relational expression (1), i.e., the specimens with total values A and B in the region to the left of the graph line L, have a larger specific wear amount than the specimens that exist in the region to the right of the graph line L.

(Role of Each Element)

The role of each element in the iron-based alloy will now be described.

(Carbon C)

Carbon has the effect of increasing the strength of iron-based alloy through solid solution, shifts of transformation temperatures, and formation of compounds in the iron-based alloy.

(Nitrogen N)

Nitrogen has the same effect as carbon, and depending on conditions, improves the corrosion resistance of the iron-based alloy, but requires an additional process to add compared to carbon.

(Molybdenum Mo)

Molybdenum improves the strength of iron-based alloy through formation of carbides, and in high-temperature environments, also contributes to the improvement in wear resistance through formation of oxides.

(Tungsten W)

Tungsten has the same effect as molybdenum.

(Chromium Cr)

Chromium improves the corrosion resistance of iron-based alloy through oxidation to form a passivation layer.

(Nickel Ni)

Nickel has the effect of increasing the tenacity and strength of iron-based alloy. Nickel also has the effect of improving the corrosion resistance and heat resistance of iron-based alloy.

(Copper Cu)

Copper has the effect of improving the corrosion resistance of iron-based alloy. It also improves the press workability of iron-based alloys by making work hardening less likely to occur. However, at high temperatures, copper may decrease the wear resistance of iron-based alloy due to a decrease in hardness.

The nozzle component P according to some embodiments may appropriately contain elements such as sulfur S, manganese Mn, niobium Nb, and silicon Si. Further, the nozzle component P according to some embodiments may contain so-called incidental impurities.

(Upper Limit Value of Molybdenum Content and Total Value B)

As described above, molybdenum and tungsten have the effect of increasing the strength and wear resistance of iron-based alloy. However, excessive addition of molybdenum and tungsten may cause the nozzle component P to become too hard and brittle. Further, since molybdenum and tungsten are relatively expensive metallic elements, it is desirable to control their addition in terms of the manufacturing cost.

As a result of inventors' diligent study, it was found that when molybdenum content is 5.0 mass % or less, the embrittlement can be suppressed. Further, it was found that when the total value B of 0.5 times tungsten content and molybdenum content is 6.0 mass % or less, the embrittlement can be suppressed.

In view of this, in the nozzle component P according to some embodiments, molybdenum content is preferably 5.0 mass % or less. Further, in the nozzle component P according to some embodiments, the total value B of 0.5 times tungsten content and molybdenum content is preferably 6.0 mass % or less. Thereby, it is possible to suppress the embrittlement of the nozzle component P.

Further, as a result of the inventors' diligent study, it was found that the wear resistance of iron-based alloy in the medium temperature range around 400° C. can be improved by controlling the excess addition of molybdenum. Therefore, from the viewpoint of ensuring the wear resistance of the nozzle component P in the medium temperature range around 400° C., molybdenum content may be 2.5 mass % or less.

(Addition Amount of Copper)

As described above, copper has the effect of improving the corrosion resistance and press workability of iron-based alloy. However, excessive addition of copper to iron-based alloy causes a decrease in wear resistance due to a decrease in high-temperature hardness. Therefore, in order to obtain high-temperature wear resistance, copper content in the nozzle component P is preferably 0.0 mass % or more and less than 3.0 mass %.

Thereby, it is possible to suppress a decrease in wear resistance of the nozzle component P in high-temperature environments.

(Addition Amount of Carbon)

As described above, carbon has the effect of increasing the hardness of iron-based alloy through solid solution and formation of compounds, and the increase in hardness is also expected to improve the wear resistance. However, in a material such as stainless steel, where corrosion resistance is ensured by chromium, carbon forms chromium carbides at high temperatures, reducing the concentration of metallic chromium in the material and causing a decrease in corrosion resistance. Therefore, improving the wear resistance only by adding carbon is undesirable for a material used in high-temperature environments.

In view of this, in the nozzle component P according to some embodiments, carbon content in the nozzle component P is preferably 0.0 mass % or more and 2.0 mass % or less.

As described above, when the composition of iron-based alloy satisfies the relational expression (1) and the total value B is 1.5 mass % or more, the addition amount of molybdenum and tungsten can be ensured, and when carbon content is 0.0 mass % or more and 2.0 mass % or less, the wear resistance of the nozzle component P in high-temperature environments can be improved while suppressing a decrease in corrosion resistance as described above.

The nozzle component P according to some embodiments does not necessarily have to be configured such that the composition satisfies the relational expression (1) and the total value B is 1.5 mass % or more in the entire region of the nozzle component P. For example, the nozzle component P may be configured such that the composition satisfies the relational expression (1) and the total value B is 1.5 mass % or more at least in the vicinity of the surface of the region where relative sliding occurs against another component.

That is, the nozzle component P according to some embodiments may include a first region R1 and a second region R2. Here, the first region R1 is a region covering at least a part of a surface S of the nozzle component P between the surface S and a position where depth from the surface S is 20 μm or more and 150 μm or less. The first region R1 satisfies the relational expression (1), and the total value B is 1.5 mass % or more. The second region R2 is a region whose position in the nozzle component P and composition differ from those of the first region R1.

As an example, if the nozzle component P is the nozzle mount 2, the first region R1 may be a region between the inner peripheral surface 2s of the through hole 2c and a position where depth from the inner peripheral surface 2s is 20 μm or more and 150 μm or less. Further, the second region may be, for example, a region including a position where depth from the inner peripheral surface 2s exceeds 150 μm.

For example, in the nozzle component P made of iron-based alloy, if the total value B is 1.5 mass % or more but the composition of the alloy does not satisfy the expression (1) due to low carbon or nitrogen content, the carbon or nitrogen content in a region near the surface of the nozzle component P can be increased by carburizing, nitriding, or a combination of carburizing and nitriding of the nozzle component P so that the composition in this region satisfies the relational expression (1). Thereby, it is possible to ensure the wear resistance of this region, i.e., the first region R1 in high-temperature environments.

If the thickness of the first region R1 is less than 20 μm, for example, when the surface of the nozzle component P is damaged by a foreign matter colliding with the nozzle component P, the region (second region R2) below the first region R1 may be exposed. Therefore, it is desirable that the thickness of the first region R1 is 20 μm or more. The thickness of the first region R1 should be thicker in terms of wear resistance and damage to the surface of the nozzle component P as described above, but as the thickness of the first region R1 increases, the cost (money and time) of treatment such as carburizing and nitriding increases. Therefore, the thickness of the first region R1 is preferably 150 μm or less.

Thereby, it is possible to improve the wear resistance of the nozzle component in high-temperature environments.

For example, as described above by way of example, in some embodiments, the nozzle component P may be the nozzle mount 2.

In the variable nozzle mechanism 10 of the variable geometry turbocharger 1 according to an embodiment, the nozzle shaft 8b of the nozzle vane member 8 is rotatably inserted through the through hole 2c of the nozzle mount 2, and the outer peripheral surface 8s of the nozzle shaft 8b and the inner peripheral surface 2s of the through hole 2c slide against each other during operation of the variable geometry turbocharger 1.

When the nozzle component P according to some embodiments is the nozzle mount 2, that is, when the nozzle mount 2 is composed of the iron-based alloy having the above-described composition, the wear resistance of the through hole 2c of the nozzle mount 2 can be improved in high-temperature environments, so that the decrease in control accuracy of the blade angle of the nozzle vane 8a can be suppressed.

The variable nozzle mechanism 10 of the variable geometry turbocharger 1 according to an embodiment is provided with a first component P1, and a second component P2 capable of sliding against the first component P1. The first component P1 is the nozzle component P composed of the iron-based alloy having the above-described composition.

Thereby, it is possible to improve the wear resistance of the first component in high-temperature environments.

Here, the first component P1 and the second component P2 are components that slide against each other.

As described above, relative sliding occurs, for example, between the outer peripheral surface 8s of the nozzle shaft 8b and the inner peripheral surface 2s of the through hole 2c of the nozzle mount 2. Therefore, in the variable nozzle mechanism 10 according to an embodiment, for example, when the first component P1 is the nozzle mount 2, the second component P2 may be the nozzle vane member 8. Conversely, for example, when the first component P1 is the nozzle vane member 8, the second component P2 may be the nozzle mount 2.

Further as described above, relative sliding occurs, for example, between the outer peripheral surface 3s of the connecting shaft portion 3a at one end of the lever plate 3 and the inner peripheral surface 5s of the groove portion 5a of the drive ring 5. Therefore, in the variable nozzle mechanism 10 according to an embodiment, for example, when the first component P1 is the lever plate 3, the second component P2 may be the drive ring 5. Conversely, for example, when the first component P1 is the drive ring 5, the second component P2 may be the lever plate 3.

The second component P2 may be composed of an iron-based alloy. Additionally, the composition of the second component P2 may satisfy the relational expression (1), and the total value B may be 1.5 mass % or more.

Alternatively, the second component P2 may be composed of a nickel-based alloy.

Thereby, it is also possible to improve the wear resistance of the second component P2 in high-temperature environments.

When the second component P2 is composed of an iron-based alloy, the manufacturing cost of the second component P2 can be reduced compared to the case where the second component P2 is composed of a heat-resistant alloy such as a nickel-based alloy.

Further, even when the second component P2 is composed of a nickel-based alloy, if the first component P1 is an iron-based alloy, the manufacturing cost of the first component P1 can be reduced compared to the case where the first component P1 is composed of a heat-resistant alloy such as a nickel-based alloy.

Further, since the variable geometry turbocharger 1 according to an embodiment is provided with the variable nozzle mechanism 10 according to an embodiment, it is possible to improve the durability of the variable geometry turbocharger 1.

(Nozzle component production method)

A method of producing a nozzle component P according to some embodiments will be described.

Figure 6A:
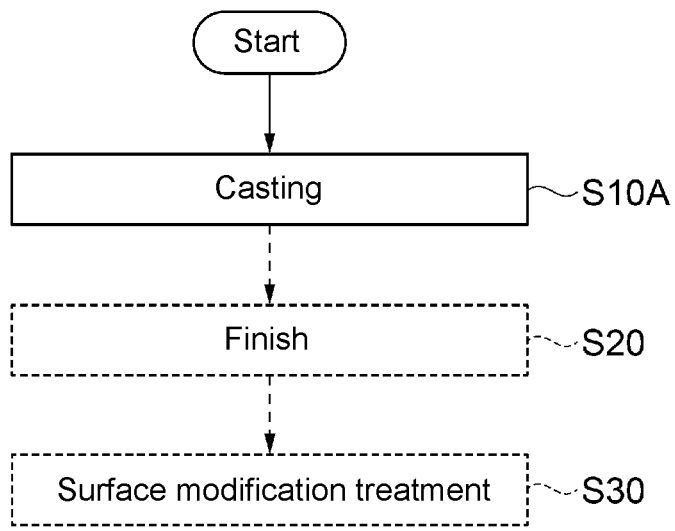
FIG. 6A is a flowchart for producing a nozzle component by casting according to some embodiments.

FIG. 6A is a flowchart for producing a nozzle component P by casting according to some embodiments.

Figure 6B:
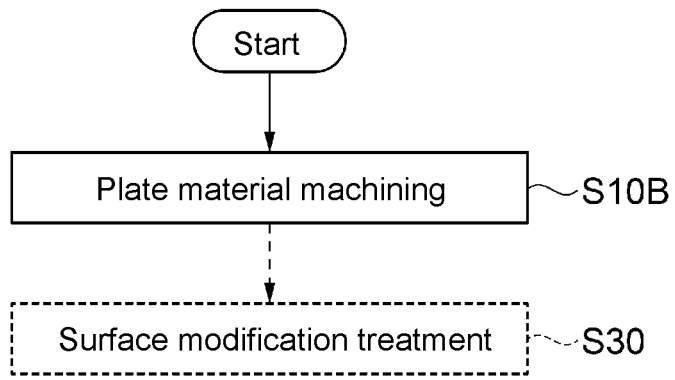
FIG. 6B is a flowchart for producing a nozzle component from a plate material such as a rolled material according to some embodiments.

FIG. 6B is a flowchart for producing a nozzle component P from a plate material such as a rolled material according to some embodiments.

As shown in FIG. 6A, the method of producing the nozzle component P according to one embodiment includes a casting step S10A of forming the nozzle component P by casting using the iron-based alloy having the composition according to the above-described embodiments.

The method of producing the nozzle component P according to one embodiment may include a finishing step S20 of finishing the cast product (nozzle component P) obtained in the casting step S10A by cutting or the like.

Further, as described above, when it is necessary to perform carburizing or nitriding, the cast product (nozzle component P) obtained in the casting step S10A or the cast product (nozzle component P) that has undergone the finishing step S20 may be subjected to carburizing, nitriding, or the like. That is, the method of producing the nozzle component P according to one embodiment may include a surface modification treatment step S30 of performing a surface modification treatment such as carburizing and nitriding on the cast product (nozzle component P) obtained in the casting step S10A or the cast product (nozzle component P) that has undergone the finishing step S20.

As shown in FIG. 6B, the method of producing the nozzle component P according to another embodiment includes a plate material machining step S10B of forming the nozzle component P from a plate material such as a rolled material made of the iron-based alloy having the composition according to the above-described embodiments.

The method of producing the nozzle component P according to the other embodiment may include a surface modification treatment step S30 of performing a surface modification treatment such as carburizing and nitriding on the nozzle component P obtained in the plate material machining step S10B.

As described above, the method of producing the nozzle component P according to some embodiments is the method of producing the nozzle component P included in the variable nozzle mechanism 10 of the variable geometry turbocharger 1 and includes the casting step S10A or the plate material machining step S10B in which the nozzle component P is formed by casting or machining a plate material.

Thereby, the manufacturing cost of the nozzle component P can be suppressed compared to the case where the nozzle component P is formed of, for example, a sintered alloy obtained by molding and sintering metal powder. Further, compared to forming the nozzle component P of, for example, a sintered alloy, forming the nozzle component P by casting or machining a plate material (rolled material) makes it easier to densify the microstructure of the nozzle component P. Therefore, the strength of the nozzle component P can be easily ensured, and the durability of the nozzle component P can be easily ensured.

Whether or not the nozzle component P is a cast product can be identified, for example, by observing the microstructure of the cross-section of the nozzle component P and whether dendrite structure is observed. In other words, if dendrite structure is observed in the cross-section of the nozzle component P, the nozzle component is a cast product.

Whether or not the nozzle component P is formed from a plate material such as a rolled material can be inferred from, for example, the morphology of microstructure, porosity, and the existence form of pores by observing the microstructure of the cross-section of the nozzle component P.

The present disclosure is not limited to the embodiments described above, but includes modifications to the embodiments described above, and embodiments composed of combinations of those embodiments.

The contents described in the above embodiments would be understood as follows, for instance.

(1) A nozzle component P according to at least one embodiment of the present disclosure is a nozzle component P included in a variable nozzle mechanism 10 of a variable geometry turbocharger 1. The nozzle component P is composed of an iron-based alloy and satisfying the following relational expression:

$$6.6 \times A + B \geq 8.0,$$

where A is a total value (mass %) of carbon content and nitrogen content, and B is a total value (mass %) of 0.5 times tungsten content and molybdenum content. The total value B is 1.5 mass % or more.

With the above configuration (1), it is possible to improve the wear resistance of the nozzle component P in high-temperature environments.

(2) In some embodiments, in the above configuration (1), molybdenum content may be 5.0 mass % or less.

With the above configuration (2), it is possible to suppress the embrittlement of the nozzle component P.

(3) In some embodiments, in the above configuration (1) or (2), copper content in the nozzle component P may be 0.0 mass % or more and less than 3.0 mass %.

With the above configuration (3), it is possible to suppress a decrease in wear resistance of the nozzle component P in high-temperature environments.

(4) In some embodiments, in any one of the above configurations (1) to (3), carbon content in the nozzle component P may be 0.0 mass % or more and 2.0 mass % or less.

With the above configuration (4), in addition to the composition of iron-based alloy satisfying the above-described relational expression with the total value B being 1.5 mass % or more, since carbon content is 0.0 mass % or more and 2.0 mass % or less, the wear resistance of the nozzle component P in high-temperature environments can be improved while suppressing a decrease in corrosion resistance as described above.

(5) In some embodiments, in any one of the above configurations (1) to (4), the nozzle component P may include a first region R1 and a second region R2. Here, the first region R1 is a region covering at least a part of a surface S of the nozzle component P between the surface S and a position where depth from the surface S is 20 μm or more and 150 μm or less. The first region R1 satisfies the above-described relational expression, and the total value B is 1.5 mass % or more. The second region R2 is a region whose position in the nozzle component P and composition differ from those of the first region R1.

With the above configuration (5), similarly, it is possible to improve the wear resistance of the nozzle component P in high-temperature environments.

(6) In some embodiments, in any one of the above configurations (1) to (5), the nozzle component P may be a nozzle mount 2.

With the above configuration (6), the wear resistance of the through hole 2*c* of the nozzle mount 2 can be improved in high-temperature environments, so that the decrease in control accuracy of the blade angle of the nozzle vane 8*a* can be suppressed.

(7) A variable nozzle mechanism 10 of a variable geometry turbocharger 1 according to at least one embodiment of the present disclosure is provided with a first component P1, and a second component P2 capable of sliding against the first component P1. The first component P1 is the nozzle component P having any one of the above configurations (1) to (6).

With the above configuration (7), it is possible to improve the wear resistance of the first component P1 in high-temperature environments.

(8) In some embodiments, in the above configuration (7), the second component P2 may be composed of an iron-based alloy. Additionally, the composition of the second component P2 may satisfy the above-described relational expression, and the total value B may be 1.5 mass % or more.

With the above configuration (8), it is also possible to improve the wear resistance of the second component P2 in high-temperature environments.

(9) In some embodiments, in the above configuration (7), the second component P2 may be composed of a nickel-based alloy.

With the above configuration (9), it is possible to improve the wear resistance of the second component P2 in high-temperature environments.

(10) A variable geometry turbocharger 1 according to at least one embodiment of the present disclosure is provided with the variable nozzle mechanism 10 having any one of the above configurations (7) to (9).

With the above configuration (10), it is possible to improve the durability of the variable geometry turbocharger 1.

(11) A nozzle component producing method according to at least one embodiment of the present disclosure is a method of producing the nozzle component P included in the variable nozzle mechanism 10 of the variable geometry turbocharger 1 and includes a step of forming the nozzle component P described in claim 1 by casting or machining a plate material (casting step S10A or plate material machining step S10B).

With the above method (11), the manufacturing cost of the nozzle component P can be suppressed compared to the case where the nozzle component P is formed of, for example, a sintered alloy obtained by molding and sintering metal powder. Further, with the above method (11), compared to forming the nozzle component P of, for example, a sintered alloy, forming the nozzle component P by casting or machining a plate material (rolled material) makes it easier to densify the microstructure of the nozzle component P. Therefore, the strength of the nozzle component P can be easily ensured, and the durability of the nozzle component P can be easily ensured.

REFERENCE SIGNS LIST

1 Variable geometry turbocharger
2 Nozzle mount
3 Lever plate
5 Drive ring
8 Nozzle vane member
10 Variable nozzle mechanism
P Nozzle component
P1 First component
P2 Second component R1 First region
R2 Second region

The invention claimed is:

1. A nozzle component included in a variable nozzle mechanism of a variable geometry turbocharger,
the nozzle component being composed of an iron-based alloy and satisfying the following relational expression:

$$6.6 \times A + B \geq 8.0,$$

where A is a total value (mass %) of carbon content and nitrogen content, and
B is a total value (mass %) of molybdenum content and 0.5 times tungsten content,
wherein the total value B is 1.5 mass % or more,
wherein carbon content in the nozzle component is greater than 0.0 mass %,
wherein nitrogen content in the nozzle component is greater than 0.0 mass %,
wherein tungsten content in the nozzle component is greater than 0.0 mass %,
wherein molybdenum content in the nozzle component is 0.4 mass % or more, and
wherein the nozzle component includes:
a first region covering at least a part of a surface of the nozzle component between the surface and a position where depth from the surface is at or between 20 μm and 150 μm, the first region satisfying the relational expression and the total value B being 1.5 mass % or more; and
a second region whose position in the nozzle component and composition differ from those of the first region.

2. The nozzle component according to claim 1,
wherein molybdenum content in the nozzle component is 5.0 mass % or less.

3. The nozzle component according to claim 1,
wherein copper content in the nozzle component is 0.0 mass % or more and less than 3.0 mass %.

4. The nozzle component according to claim 1,
wherein carbon content in the nozzle component is 2.0 mass % or less.

5. The nozzle component according to claim 1,
wherein the nozzle component is a nozzle mount.

6. A variable nozzle mechanism of a variable geometry turbocharger, comprising:
a first component; and
a second component capable of sliding against the first component,
wherein the first component is the nozzle component according to claim 1.

7. The variable nozzle mechanism of a variable geometry turbocharger according to claim 6,
wherein the second component is composed of an iron-based alloy, and
the second component satisfies the relational expression and the total value B is 1.5 mass % or more.

8. The variable nozzle mechanism of a variable geometry turbocharger according to claim 6,
wherein the second component is composed of a nickel-based alloy.

9. A variable geometry turbocharger, comprising the variable nozzle mechanism according to claim 6.

10. A method of producing a nozzle component included in a variable nozzle mechanism of a variable geometry turbocharger,
the method comprising a step of forming the nozzle component according to claim 1 by casting or machining a plate material.

* * * * *